United States Patent [19]
Mills

[11] Patent Number: 5,653,492
[45] Date of Patent: Aug. 5, 1997

[54] ZIPPERED THREE-PANEL VEHICLE COVER

[76] Inventor: Dennis Mills, 2219 Lake Holloway Blvd., Lakeland, Fla. 33801

[21] Appl. No.: 626,155

[22] Filed: Apr. 4, 1996

[51] Int. Cl.$^6$ ........................................................ B60J 11/00
[52] U.S. Cl. ............................................ 296/136; 150/166
[58] Field of Search ................................ 296/136, 95.1; 150/166; 160/370.21

[56] References Cited

U.S. PATENT DOCUMENTS

| | | | |
|---|---|---|---|
| 2,646,097 | 7/1953 | Gaverth et al. | 296/95.1 X |
| 4,294,483 | 10/1981 | Ferris | 296/136 |
| 4,799,728 | 1/1989 | Akers et al. | 296/136 |
| 4,938,522 | 7/1990 | Herron et al. | 296/136 |
| 5,161,849 | 11/1992 | Holland, Jr. | 296/136 X |
| 5,497,819 | 3/1996 | Chiang | 296/136 X |

Primary Examiner—Joseph D. Pape

[57] ABSTRACT

A three-panel vehicle cover comprising two side panels each connected by full length zippers to a center panel, upper flaps of material overlaying the zippers to prevent adverse elements from penetrating through the zippers, lower flaps of material underlaying the zippers to prevent the zippers from scratching the surface of the vehicle over which it is used, and structure for temporarily supporting each side panel in a position adjacent to the center panel during deployment and removal for ease in securely zipping the two panels together. It is contemplated for the vehicle cover to be configured to the approximate contour of the vehicle on which it will be used and for zippers to have removable locking members attached thereto. Also, the vehicle cover may have a lower hem on its bottom edge, with a stretchable cord positioned therein, to help maintain the vehicle cover in a fixed position over a vehicle. Applications may include, but are not limited to, daily use as a temporary vehicle cover, extended use as a portable garage, use in protecting new vehicles during transport to dealerships for subsequent sale, and use in covering automobiles as well as sport utility vehicles.

18 Claims, 3 Drawing Sheets

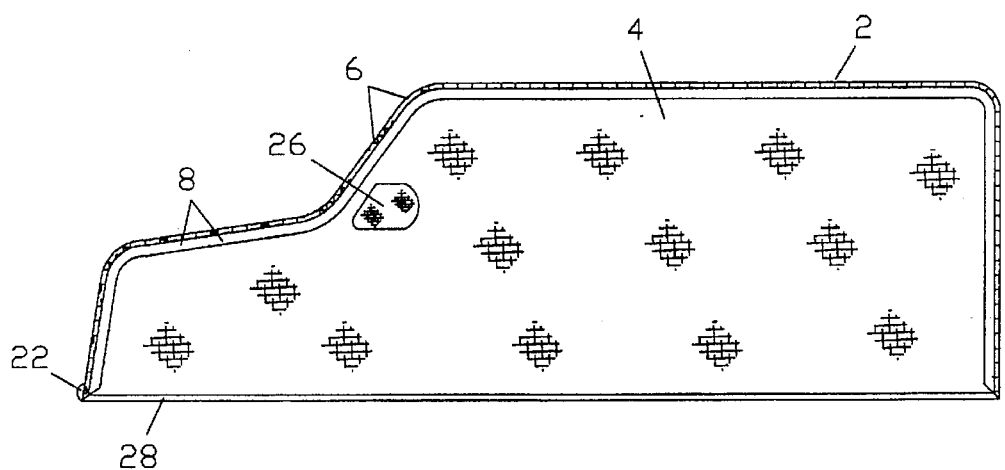
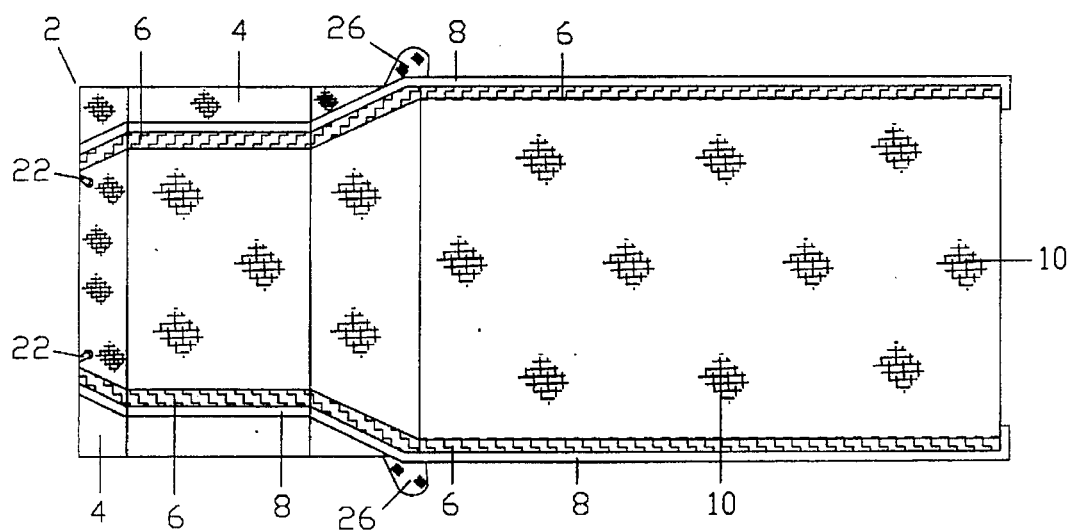

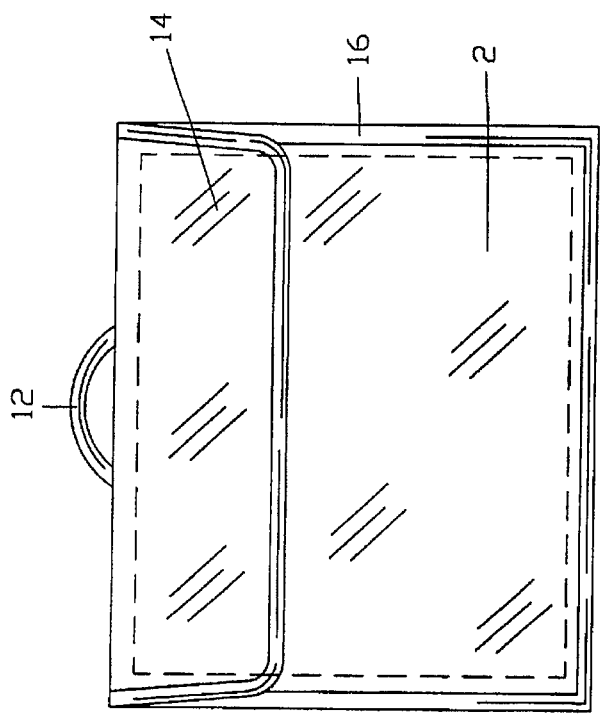
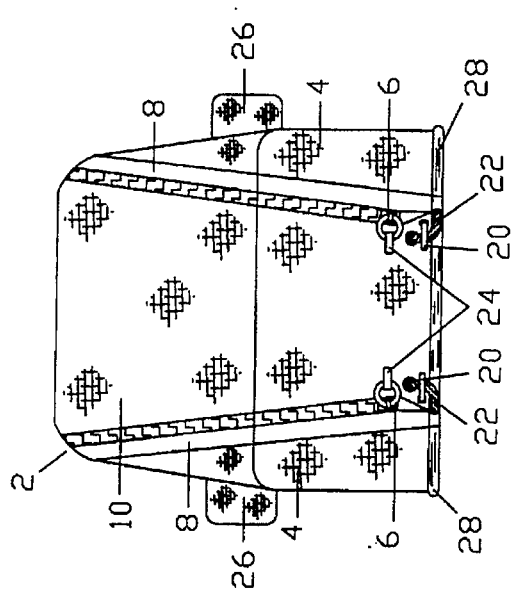
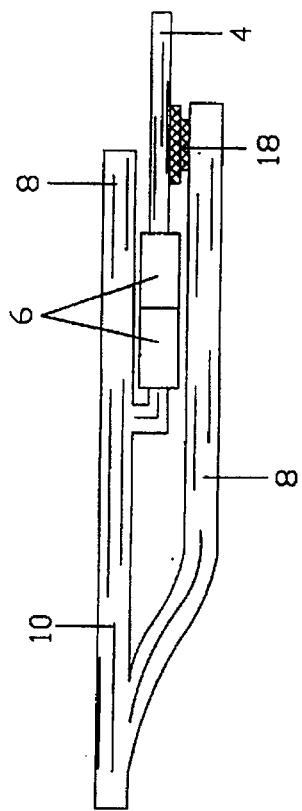

ZIPPERED THREE-PANEL VEHICLE COVER

BACKGROUND—FIELD OF INVENTION

This invention relates to vehicle covers, specifically to a three-panel vehicle cover made of sturdy material and comprising two side panels each connected by zippered means to a center panel, upper flaps of material overlaying each zipper to prevent adverse elements from penetrating through the zippers, lower flaps of material underlaying the zippers to prevent them from scratching the surface of the vehicle over which it is used, and a means for holding each side panel in a position adjacent to the center panel for ease in securely zipping the two panels together. Applications may include, but are not limited to, daily use as a temporary vehicle cover, extended use as a portable garage, use in protecting new vehicles during transport to dealerships for subsequent sale, and use in covering automobiles as well as sport utility vehicles.

BACKGROUND—DESCRIPTION OF PRIOR ART

Vehicle covers are useful for protecting the outer surfaces of a vehicle from dust, wind, snow, acid rain, hail, ultraviolet radiation, tree sap, vandalism, and contact with animals and birds. Many types of vehicle covers are known. Some vehicle covers are made of lightweight material, such as nylon, so that they are easy to deploy over the surface of the vehicle, however such vehicle covers usually do not fit closely to the contour of the vehicle and must be secured to the vehicle to prevent them from blowing away in a strong wind. Also, loose vehicle covers tend to billow in the wind, allowing dirt and debris to enter under the vehicle cover and scratch vehicle paint as the wind driven vehicle cover moves back and forth against the vehicle surface. Other vehicle covers are made of sturdier materials which do not billow in the wind, however, sturdier vehicle covers typically are not easy to deploy as they can be bulky, heavy, stiff, and generally difficult to handle. The present invention provides a vehicle cover made of a sturdy material which comprises three easy to handle panels which when connected together cover the upper, side, and end surfaces of a vehicle. The present invention also comprises easily releasable fasteners adjacent to the connecting edges of each panel for temporary support of each side panel in a position adjacent to the center panel during deployment and removal so that a user may easily engage and disengage the paired coupling member carrier strips forming each zipper which securely attach each side panel to the center panel. It is not known to have a vehicle cover comprising two side panels and one center panel, each made from a sturdy, durable material such as "TOP GUN" polyester and each of which is lighter in weight and easier to handle than a one-piece vehicle cover made of like material which covers the upper, side, and end surfaces of a vehicle, its two side panels each being connected by full length zippered means to the center panel, with upper flaps of material overlaying each zipper to prevent adverse elements from penetrating through the zippers, and lower flaps of material underlaying the zippers to prevent them from scratching the surface of the vehicle over which it is used, and further comprising easily releasable fasteners adjacent to the connecting edges of each panel for holding the connecting edge of each side panel in a position adjacent to one of the lateral edges of the center panel during deployment and removal so that a user may easily zipper each side panel to the center panel.

The prior art known to be the most closely related to the present invention is the invention disclosed in U.S. Pat. No. 5,215,345 to Orphan (1993). The Orphan invention discloses a cover for the floor and walls of the cargo area within a vehicle having fold-down rear seats. Two forward extensions of the Orphan invention each extend over one rear seat back and when both seat backs are in an upright position, or a folded-down position, the two forward extensions may be joined by a zipper to provide additional protection for underlying upholstery. However, the Orphan invention does not disclose protective flaps overlaying the zipper to prevent it from scratching the upholstery of the rear seat backs.

SUMMARY OF INVENTION—OBJECTS AND ADVANTAGES

It is the primary object of this invention to provide a vehicle cover having a three-panel zippered construction for easy deployment and removal of the vehicle cover from a vehicle. It is also an object of this invention to provide a three-panel vehicle cover having a configuration which approximates the contour of a vehicle over which it is to be deployed. A further object of this invention is to provide a three-panel vehicle cover with protective upper flaps of material overlaying each connecting zipper to prevent adverse elements from penetrating through the zippers, lower flaps of material underlaying each connecting zipper to prevent the zippers from scratching the surface of the vehicle over which it is used. It is also an object of this invention to provide a three-panel vehicle cover which has a means for temporarily supporting each side panel in a position adjacent to the center panel to aid a user in easily zipping adjacent panels together. A further object of this invention is to provide a three-panel vehicle cover with a full length zippered connection between adjacent panels which may be locked during use to prevent tampering and theft. It is also an object of this invention to provide a carrying case for the three-panel vehicle cover for compact storage of the panels after use. A further object of this invention is to provide a three-panel vehicle cover made from sturdy, durable materials which could be used effectively for extended storage of a vehicle.

As described herein, properly manufactured and installed over a vehicle, the present invention would provide a three-panel vehicle cover which is easily deployed and easily removed from a vehicle for protection of that vehicle from adverse elements such as dust, wind, snow, acid rain, hail, ultraviolet radiation, tree sap, vandalism, and contact with animals and birds. It is contemplated for the present invention to be made from a sturdy, durable material, such a "TOP GUN" polyester, so that the present invention may be used as a portable garage or for extended storage of a vehicle. During use, the connected three-panel construction of the present invention provides a configuration contoured to the approximate configuration of the vehicle over which it is to be deployed. A stretchable cord in a lower hem on the unzippered edges of each side panel also helps to maintain the present invention in a secure position over a vehicle during use. It is contemplated for the present invention to have one center panel and two side panels, each side panel being connected to the center panel by full length zippered means. It is also contemplated for the zippered means to be lockable so as to discourage tampering and theft of both the present invention and the vehicle over which it is deployed. An upper flap of material on each longitudinal edge of the center panel overlays each connecting zipper to prevent adverse elements from penetrating through the zippers and a lower flap of material on each longitudinal edge of the center panel underlays each connecting zipper to prevent the zippers from scratching the surface of the vehicle over which it is used. In the preferred embodiment, hook and pile fasteners attached to both of the lateral edges of the center panel, and to the connecting edges of each side panel, temporarily support each side panel in a position adjacent to the center panel during deployment and removal for ease in securely zipping each side panel to the center panel. The present invention may be stored in a carrying case which allows for compact storage of the panels after use.

The description herein provides preferred embodiments of the present invention but should not be construed as limiting the scope of the zippered three-panel vehicle cover invention. Variations in the length of the panels, the width of the zippers, the amount of material used in each flap to overlay an adjacent zipper, the width of the lower hem, the type of elastic cord used in the lower hem, the type of locking means used to prevent unauthorized unfastening of the zippers, the size and shape of the portion of the vehicle cover used to cover the side-view mirrors of a vehicle, and the configuration of the carrying case used to store the vehicle cover, other than those shown and described herein, may be incorporated into the present invention. Thus the scope of the present invention should be determined by the appended claims and their legal equivalents, rather than the examples given.

BRIEF DESCRIPTION OF THE DRAWINGS

FIG. 1 is a side view of a first embodiment of the invention covering a sport utility vehicle.

FIG. 2 is a top view of the first embodiment of the invention coveting a sport utility vehicle.

FIG. 3 is a front view of the first embodiment of the invention covering a sport utility vehicle.

FIG. 4 is a sectional view of the overlaying flaps of the invention.

FIG. 5 is a front view of the carrying case portion of the invention.

DETAILED DESCRIPTION OF PREFERRED EMBODIMENTS

Figure 6:
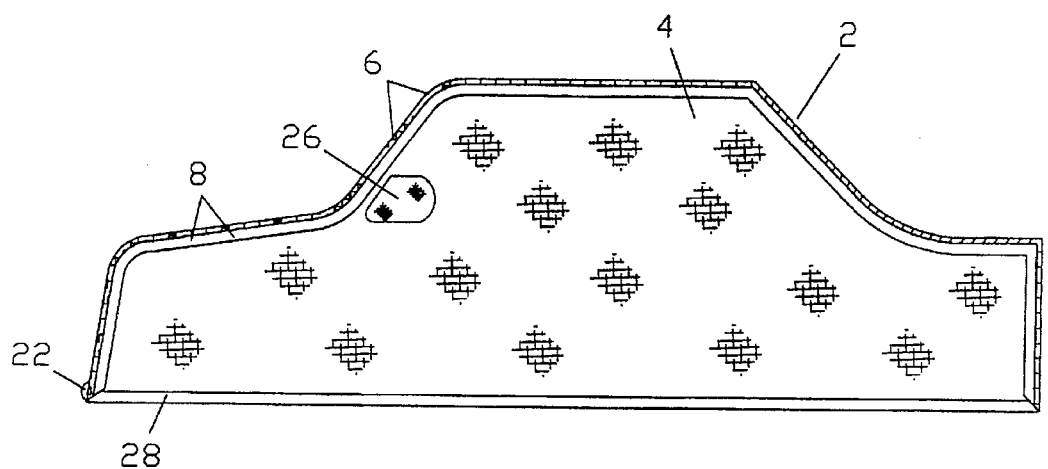
FIG. 6 is a side view of a second embodiment of the invention covering an automobile.

FIG. 1 shows a first embodiment of a vehicle cover invention 2 configured to the contour of the top, the sides, and the opposite ends of a sport utility vehicle (not shown). Vehicle cover invention 2 is shown in FIG. 1 to have a side panel 4 with a lower hem 28 on its bottom edge and one of a pair of coupling member carrier strips forming a zipper 6 attached to the upper edge and opposite end portions of side panel 4. Although in the preferred embodiment of vehicle cover invention 2 it is contemplated to have two independently engaging pairs of coupling member carrier strips attached to each side panel 4, with each carrier strip being initially fastened to its paired carrier strip at opposite ends of side panel 4 and progressively pressed against its paired carrier strip until both carrier strips of each pair become fully pressed against each other, the number of zippers 6 attached to each side panel 4 is not critical to vehicle cover invention 2. FIG. 1 also shows hook and pile type fasteners 22 positioned on the bottom edge of side panel 4 adjacent to lower hem 28, a protective flap 8 adjacent to zipper 6, a pair of zipper pulls 24, each zipper pull 24 being attached to one of the two independently engaging pairs of coupling member carrier strips comprising each zipper 6, and a locking means 30 securing each zipper pull 24 to the other zipper pull 24 of its pair.

FIGS. 2 and 3 show the first embodiment of vehicle cover invention 2 having two side panels 4 each connected to a center panel 10 by an independently engaging zipper 6. FIGS. 2 and 3 show protective flaps 8 adjacent to each zipper 6, two pairs of zipper pulls 24, each zipper pull 24 being attached to one of the two independently functioning pairs of coupling member carrier strips comprising each zipper 6, and locking means 30 securing each paired zipper pull 24 to the other zipper pull 24 of its pair. FIGS. 2 and 3 also show hook and pile type fasteners 22 depending from the bottom edge of each side panel 4 and mirror covers 26 attached to each side panel 4. In addition, FIG. 3 shows a lower hem 28 attached to the bottom edge of each side panel 4.

FIG. 4 shows one coupling member carrier strip of zipper 6 attached to side panel 4 and the other coupling member carrier strip of zipper 6 attached to a portion of center panel 10 positioned between two protective flaps 8. One protective flap 8 overlays zipper 6 to prevent adverse elements (not shown) from penetrating through zipper 6 and the other protective flap 8 underlays zipper 6 to protect zipper 6 from scratching the surface of the vehicle (not shown) over which vehicle cover invention 2 is placed. FIG. 4 also shows an easily releasable fastener 18 positioned adjacent to zipper 6. A first portion of easily releasable fastener 18 is attached to the lower surface of side panel 4, while the second portion of easily releasable fastener 18 is attached to the upper surface of the one of protective flaps 8 which is underlays zipper 6 and attached to protective flap 8 in a position for engagement with the first portion of easily releasable fastener 18 so as to allow the two carrier strips of zipper 6 to easily engage with each other. In the preferred embodiment of vehicle cover invention 2 it is contemplated for many easily releasable fasteners 18 to be placed adjacent to zippers 6 along the full length of protective flaps 8, and for easily releasable fasteners 18 to comprise hook and pile type of fasteners. FIG. 5 shows a carrying case 16 for storage of vehicle cover invention 2. Carrying case 16 is shown to have a handle 12 and a closing flap 14. Carrying case 16 is sufficiently large to encompass center panel 10 and both side panels 4 when each is folded compactly and placed within the hollow interior of carrying case 16. Carrying case 16 is also made from a sturdy, durable material that will adequately protect the side panels and the center panel between uses.

Figure 7:
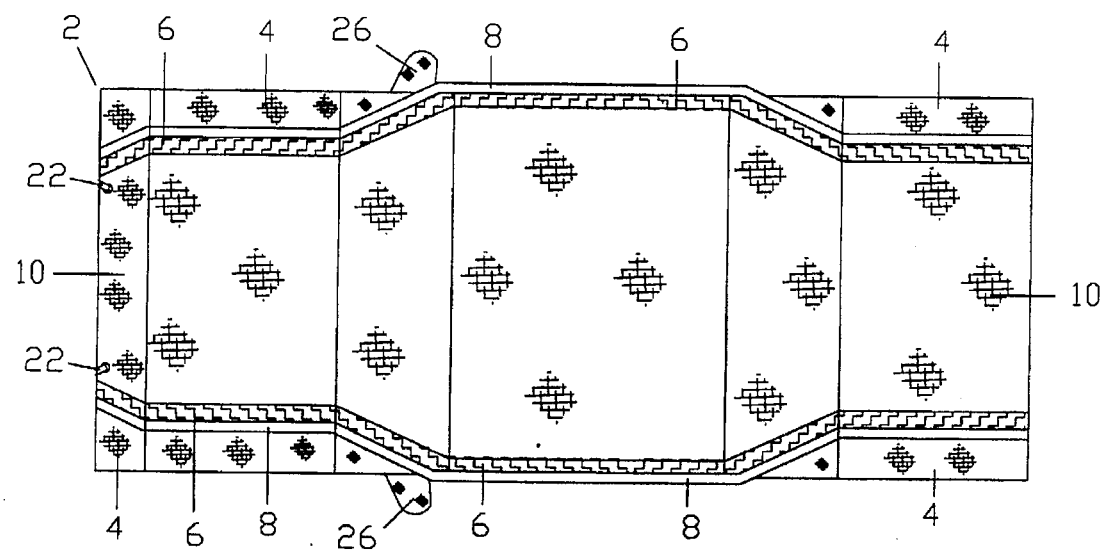
FIG. 7 is a top view of the second embodiment of the invention covering an automobile.

FIGS. 6 and 7 show a second embodiment of vehicle cover invention 2 having a configuration to approximate the contour of an automobile (not shown). FIG. 6 shows the second embodiment of vehicle cover invention 2 having side panel 4 with zipper 6 attached to its upper surface and opposite end portions. FIG. 7 shows vehicle cover invention 2 having two side panels 4 each connected to a center panel 10 by zipper 6. FIGS. 6 and 7 show protective flaps 8 adjacent to each zipper 6, a pair of zipper pulls 24 attached to each zipper 6, and locking means 30 securing each zipper pull 24 to the other zipper pull 24 of its pair. FIGS. 6 and 7 also show mirror covers 26 attached to side panels 4, as well as hook and pile type fasteners 22 attached to the bottom edge of each side panel 4. In addition, FIG. 6 shows lower hem 28 depending from the bottom edge of side panel 4.

To use vehicle cover invention 2, one would first remove side panels 4 and center panel 10 from carrying case 16. Center panel 10 would then be placed over the top and opposite ends of a vehicle (not shown). Thereafter, each side panel 4 would be separately attached by easily releasable fasteners 18 to one of the lateral edges of center panel 10.

Mirror covers 26 would be positioned over vehicle side-view mirrors (not shown). The paired coupling member carrier strips of each zipper 6 connecting center panel 10 to side panels 4 would then be attached to the other of its pair at the opposite ends of center panel 10 and side panel 4, and progressively pressed against the other of its pair by drawing zipper pulls 24 toward the center portion of vehicle cover invention 2. Once zipper pulls 24 are drawn into a position adjacent to the other of its pair, locking means 30 may be used to secure paired zipper pulls 24 together. Thereafter, hook and pile type fasteners 22 and a stretchable cord (not shown) positioned within lower hem 28 may be used to further secure vehicle cover invention 2 to a vehicle (not shown).

In the preferred embodiment center panel 10 and side panels 4 are made of "TOP GUN" polyester, zippers 6 are made from materials which are durable and easily engaged and disengaged, and zippers 6 and lower hem 28 are secured into position with "GORE-TEX" thread (not shown). Although not critical to vehicle cover invention 2, in the preferred embodiment it is contemplated for stretchable cords (not shown) positioned within lower hem 28 to be bungee-type cords.

What is claimed is:

1. A cover for a vehicle having a top, opposite ends, and two sides, said cover comprising a center panel, two side panels, a plurality of zippers, and a plurality of easily releasable fasteners; said center panel having two lateral edges and a pair of protective flaps encompassing each lateral edge, one of each of said pairs of said protective flaps being positioned to overlay the one of said lateral edges to which it is adjacent and the other of each of said pairs of said protective flaps being positioned to underlay the one of said lateral edges to which it is adjacent, said center panel also comprising a quantity of material having a size and configuration approximate to said top and said opposite ends of said vehicle; each of said side panels having an upper edge, an inside surface, and comprising a quantity of material having a size and configuration approximate to one of said sides of said vehicle; each of said zippers having a pair of coupling member carrier strips, one of said carrier strips of each of said zippers being attached to one of said lateral edges of said center panel, the other of said carrier strips of each of said zippers being attached to said upper edge of one of said side panels so that when both of said carrier strips of each of said zippers are pressed against the other of its pair, each of said zippers will be positioned between said protective flaps on said center panel and thereby being unable to scratch said vehicle and also being unaffected by elements adverse to said vehicle, said zippers cumulatively connecting said lateral edges of said center panel to said upper edges of both said side panels, said easily releasable fasteners each having two separable mating portions, one of said mating portions being attached to said inside surface of one of said side panels and the other of said mating portions being attached to the one of said protective flaps below each of said zippers in a position to engage its intended mating portion; each of said easily releasable fasteners positioned at a spaced distance from the next adjacent of said easily releasable fasteners so that each of said side panels may be temporarily supported by said center panel during deployment and removal for ease in pressing said carrier strips of each of said zippers together to securely attach each of said side panels to said center panel.

2. The cover of claim 1 further comprising two side-view mirror covers, one of said side-view mirror covers being attached to each of said side panels.

3. The cover of claim 1 further comprising at least two pairs of zipper pulls and locking means removably connectable to said zipper pulls, at least one of said pairs of said zipper pulls being attached to said carrier strips which comprise those of said zippers which are connected to the same of said side panels and which are adjacent, and said locking means securing one zipper pull of each of said pairs of zipper pulls to the other of its pair to prevent unauthorized unzipping of said side panels from said center panel.

4. The cover of claim 1 wherein said side panels and said center panel are made of "TOP GUN" polyester.

5. The cover of claim 1 further comprising a carrying case for compact storage of said center panel and said side panels after use.

6. The cover of claim 1 wherein said side panel has a bottom edge and further comprising a lower hem on said bottom edge, a plurality of hook and pile fasteners to attach said lower hem to said vehicle, and a quantity of stretchable cord positioned within said lower hem for help in securing said inside surface of said side panels into a fixed position adjacent to said vehicle.

7. The cover of claim 6 further comprising a quantity of "GORE-TEX" thread, and wherein said lower hem is held in place with said "GORE-TEX" thread and said carrier strips of said zippers are stitched to said side panels and said center panel with said "GORE-TEX" thread.

8. A cover for a vehicle having a top, opposite ends, and two sides, said cover comprising a center panel, two side panels, four zippers, and a plurality of easily releasable fasteners; said center panel having two lateral edges and a pair of protective flaps encompassing each lateral edge, one of each of said pairs of said protective flaps being positioned to overlay the one of said lateral edges to which it is adjacent and the other of each of said pairs of said protective flaps being positioned to underlay the one of said lateral edges to which it is adjacent, said center panel also comprising a quantity of material having a size and configuration approximate to said top and said opposite ends of said vehicle; each of said side panels having an upper edge, an inside surface, and comprising a quantity of material having a size and configuration approximate to one of said sides of said vehicle; each of said zippers having a pair of coupling member carrier strips, one of said carrier strips of each of said zippers being attached to one of said lateral edges of said center panel, the other of said carrier strips of two of said zippers being attached to said upper edge of each of said side panels so that when both of said carrier strips of each of said zippers are pressed against the other of its pair, each of said zippers will be positioned between said protective flaps on said center panel and thereby being unable to scratch said vehicle and also being unaffected by elements adverse to said vehicle, said zippers cumulatively connecting said lateral edges of said center panel completely to said upper edges of both of said side panels, said easily releasable fasteners each having two separable mating portions, one of said mating portions being attached to said inside surface of one of said side panels and the other of said mating portions being attached to the one of said protective flaps below each of said zippers in a position to engage its intended mating portion; each of said easily releasable fasteners positioned at a spaced distance from the next adjacent of said easily releasable fasteners so that each of said side panels may be supported against said center panel during deployment and removal for ease in pressing said carrier strips of each of said zippers together to securely attach each of said side panels to said center panel.

9. The cover of claim 8 further comprising two side-view mirror covers, one of said side-view mirror covers being attached to each of said side panels.

10. The cover of claim 8 further comprising two pairs of zipper pulls and locking means removably connectable to said zipper pulls, one pair of said zipper pulls being attached to said carrier strips of adjacent zippers, and said locking means securing one zipper pull of each of said pairs of zipper pulls to the other of its pair to prevent unauthorized unzipping of said side panels from said center panel.

11. The cover of claim 8 wherein said side panels and said center panel are made of "TOP GUN" polyester.

12. The cover of claim 8 further comprising a carrying case for compact storage of said center panel and said side panels after use.

13. The cover of claim 8 wherein said side panel has a bottom edge and further comprising a lower hem on said bottom edge, a plurality of hook and pile fasteners to attach said lower hem to said vehicle, and a quantity of stretchable cord positioned within said lower hem for help in securing said inside surface of said side panels into a fixed position adjacent to said vehicle.

14. The cover of claim 13 further comprising a quantity of "GORE-TEX" thread, and wherein said lower hem is held in place with said "GORE-TEX" thread and said carrier strips of said zippers are stitched to said side panels and said center panel with said "GORE-TEX" thread.

15. The method of covering a vehicle having a top, opposite ends, two sides, and two side-view mirrors with a three-panel zippered cover, said method comprising the steps of providing said vehicle, a center panel having a central portion, opposite end portions, two lateral edges, and a pair of protective flaps encompassing each of said lateral edges, one of each of said pairs of said protective flaps being positioned to overlay the one of said lateral edges to which it is adjacent and the other of each of said pairs of said protective flaps being positioned to underlay the one of said lateral edges to which it is adjacent, said center panel also comprising a quantity of material having a size and configuration approximate to said top and said opposite ends of said vehicle; also providing two side panels, each of said side panels having a lower hem, four zippers each having a pair of coupling member carrier strips, one of said coupling member carrier strips of each of said pairs attached to said center panel and the other of each of said pairs of said coupling member carrier strips connected to one of said side panels, a plurality of easily releasable fasteners, locking means, two pairs of zipper pulls, one of said zipper pulls attached to one of said coupling member carrier strips of each of said four zippers, and a carrying case; removing said side panels and said center panel from said carrying case; placing said center panel over said top of said vehicle; attaching a first of said side panels to said center panel with said easily releasable fasteners; positioning said mirror cover of said first side panel over the one of said side-view mirrors adjacent to said mirror cover; attaching both of said coupling member carrier strips on said first side panel to the other of its pair at one of said opposite end portions of said center panel; progressively pressing each of said coupling member carrier strips to the other of its pair by drawing said zipper pulls toward said center portion of said center panel; securing each of said zipper pulls attached to said first side panel to its paired zipper pull with said locking means once each of said zipper pulls is drawn adjacent to its paired zipper pull and said zippers are positioned between one of said pairs of said protective flaps; attaching the other of said side panels to said center panel with said easily releasable fasteners; positioning said mirror cover of the other of said side panels over the one of said side-view mirrors adjacent thereto; attaching each of said coupling member carrier strips on the other of said side panels to the other of its pair at one of said opposite end portions of said center panel; progressively pressing each of said coupling member carrier strips to the other of its pair by drawing said zipper pulls toward said center portion of said center panel so that said zippers are positioned between the other of said pairs of said protective flaps; and securing each of said zipper pulls attached to the other of said side panels to its paired zipper pull with said locking means once each of said zipper pulls is drawn adjacent to its paired zipper pull so that said center panel and said side panels together cover said top, said opposite ends, said sides, and said side-view mirrors of said vehicle.

16. The method of claim 15 wherein said easily releasable fasteners comprise hook and pile type of fasteners.

17. The method of claim 15 further comprising the step of attaching said lower hem to said opposite ends of said vehicle with some of said easily releasable fasteners, said step of attaching said lower hem following the step of progressively pressing each of said carrier strips against the other of its pair on the other of said side panels.

18. The method of claim 15 further comprising the steps of providing a stretchable cord and positioning said stretchable cord within said lower hem to further secure said cover to said vehicle, the step of positioning said stretchable cord following the step of progressively pressing each of said carrier strips against the other of its pair on the other of said side panels.

* * * * *